United States Patent [19]
Gerard

[11] Patent Number: 5,602,393
[45] Date of Patent: Feb. 11, 1997

[54] MICROBOLOMETER DETECTOR ELEMENT WITH ENHANCED SENSITIVITY

[75] Inventor: Henry M. Gerard, Capistrano Beach, Calif.

[73] Assignee: Hughes Aircraft Company, Los Angeles, Calif.

[21] Appl. No.: 479,917

[22] Filed: Jun. 7, 1995

[51] Int. Cl.$^6$ .................................. G01J 5/02; G01J 5/20
[52] U.S. Cl. ................... 250/338.4; 250/332; 250/338.1; 250/370.08
[58] Field of Search .............................. 250/338.1, 338.4, 250/332, 370.08, 349

[56] References Cited

U.S. PATENT DOCUMENTS

| | | | |
|---|---|---|---|
| 5,010,251 | 4/1991 | Grinberg et al. | 250/338.1 X |
| 5,021,663 | 6/1991 | Hornbeck | 250/338.1 X |
| 5,286,976 | 2/1994 | Cole . | |
| 5,300,915 | 4/1994 | Higashi et al. . | |
| 5,367,167 | 11/1994 | Keenan | 250/338.1 X |

OTHER PUBLICATIONS

R. A. Wood, et al., Monolithic Silicon Uncooled Focal Planes for High–Density Array Development (HIDAD) Program, Proc. IRIS Detector, 1991, vol. II.

*Primary Examiner*—Constantine Hannaher
*Assistant Examiner*—Edward J. Glick
*Attorney, Agent, or Firm*—W. C. Schubert; W. K. Denson-Low

[57] ABSTRACT

A microbolometer detector element includes an optically absorptive material structure that absorbs a portion of incident radiation, and has a plurality of openings that diffract other portions of the incident radiation. The absorptive structure has an electrical resistivity that varies as a function of its temperature. An optical radiation director re-directs the diffracted optical radiation back to the absorptive structure. The distance between the radiation director and the absorptive structure is tuned so that, for a predetermined design wavelength, optical radiation that is re-directed back to the absorptive structure constructively interferes with incident optical radiation that is not reflected by the absorptive structure. The constructive interference causes the absorptive structure to absorb substantially more optical radiation at the design wavelength than at other wavelengths. The re-directed radiation also destructively interferes with incident optical radiation that is reflected by the absorptive structure, thereby suppressing reflection of radiation. A circuit is connected to the absorptive structure to measure its electrical resistivity.

21 Claims, 3 Drawing Sheets

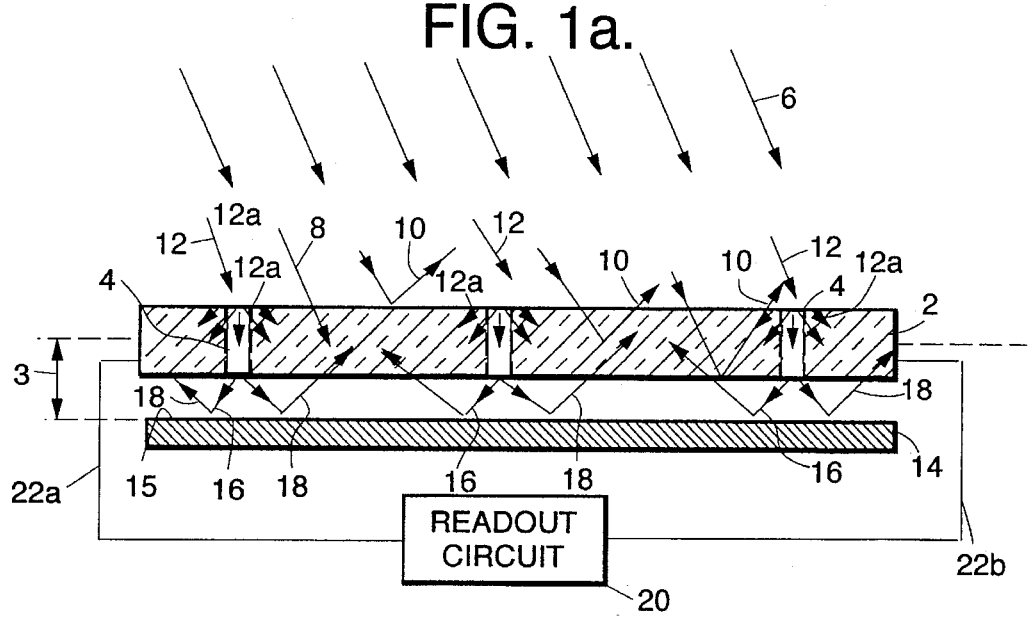
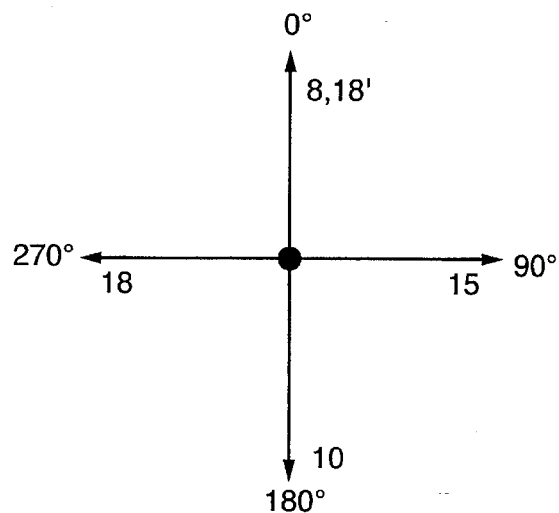
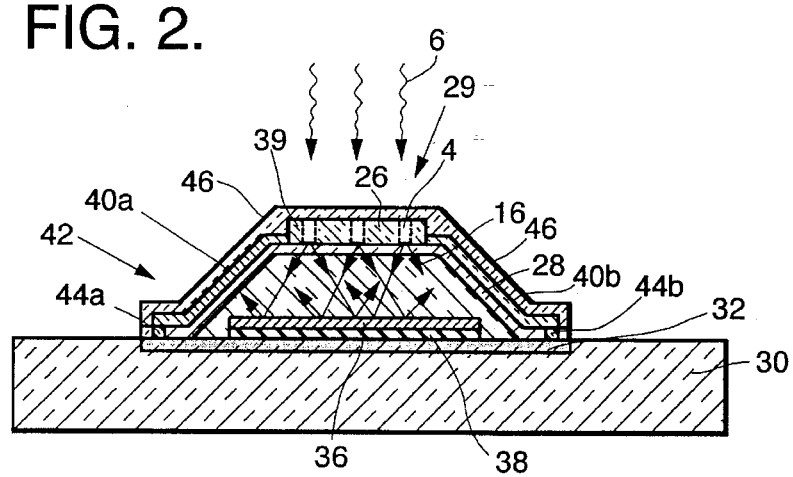

MICROBOLOMETER DETECTOR ELEMENT WITH ENHANCED SENSITIVITY

BACKGROUND OF THE INVENTION

1. Field of the Invention

This invention relates to detector elements for infrared (IR) imaging arrays, and more particularly to a microbolometer detector element with enhanced sensitivity.

2. Description of the Related Art

Microminiature bolometers (microbolometers), such as those described in U.S. Pat. No. 5,286,976, entitled "MICROSTRUCTURE DESIGN FOR HIGH IR SENSITIVITY", issued Feb. 15, 1994 to Barrett E. Cole, and in U.S. Pat. No. 5,300,915, entitled "THERMAL SENSOR", issued Apr. 5, 1994 to Robert E. Higashi et al., are used as detector pixel elements in two-dimensional IR imaging arrays.

A microbolometer generally consists of a polycrystalline semiconductor layer whose electrical resistivity varies as a function of its temperature. The layer material is chosen so that it absorbs optical radiation over a design wavelength range, which is generally in the IR region of the spectrum. The semiconductor layer is fabricated on a silicon substrate, which also contains integrated readout circuitry for monitoring the layer's resistivity. An array of microbolometers are fabricated on a single substrate to create a two-dimensional imaging array.

In operation, incident IR radiation is absorbed by the semiconductor layer, causing a change in the layer's temperature. The temperature change causes a corresponding change in the layer's resistivity, which is monitored by the readout circuitry.

The microbolometers described above utilize a continuous semiconductor absorptive layer disposed on a dielectric "bridge" structure that has been fabricated on a silicon substrate. The bridge structure supports the layer so that it is spaced away from the silicon substrate surface. Incident optical radiation is partially absorbed by the layer. A portion of the non-absorbed light passes through the layer and strikes a reflective metal layer that has been fabricated on the silicon substrate surface directly below the layer (under the "bridge" structure). The metal layer reflects the radiation back to the absorptive layer, where it again gets partially absorbed. By proper adjustment of the spacing between the absorptive layer and the reflective metal layer, constructive optical interference can be achieved between the incident optical radiation and the reflected optical radiation at the absorptive layer. However, for any given absorptive layer to metal layer spacing the constructive interference only occurs for wavelengths in which the antinodes of the incident and reflected radiation components overlap. For these wavelengths, the electromagnetic field strength at the absorptive layer will be increased, resulting in higher absorption.

The microbolometer's sensitivity is dependent on the semiconductor layer's absorption coefficient ($\alpha$), the temperature change caused in the layer per unit of optical energy absorbed (dT/dA) and the electrical resistance change in the layer caused per unit of temperature change (dR/dT). DT/dA varies inversely with the heat capacity of the semiconductor layer. Therefore, as the mass of the semiconductor layer decreases, dT/dA increases. The absorption enhancement caused by constructive interference effects require that any incident optical radiation that is not absorbed by the layer be transmitted to the metal layer below. If the absorptive layer reflects any optical radiation, total absorption is reduced. Reflectance at the absorptive layer can be reduced by precisely controlling the uniformity of the layer, which is difficult to accomplish with current microbolometer processing techniques.

SUMMARY OF THE INVENTION

In view of the above problem, the present invention provides a microbolometer detector element that exhibits less reflection of incident optical radiation, and is more sensitive than prior detector elements. This is accomplished by providing an optically absorptive material structure that absorbs a portion of the incident radiation, and that has a plurality of openings that diffract other portions of the incident radiation. The absorptive structure has an electrical resistivity that varies as a function of its temperature.

The openings in the absorptive structure result in less reflectance of incident optical radiation for wavelengths between about one-tenth and twice the size of the openings. These wavelengths are either absorbed by the structure or diffracted by the openings. An optical radiation director re-directs the diffracted optical radiation to the absorptive structure. The distance between the radiation director and the absorptive structure is tuned so that, for a predetermined design wavelength, optical radiation that is re-directed to the absorptive structure constructively interferes with incident optical radiation that is not reflected by the absorptive structure. The constructive interference causes the absorptive structure to absorb substantially more optical radiation at the design wavelength than at other wavelengths.

The optical radiation, at the predetermined design wavelength, that is re-directed to the absorptive structure also destructively interferes with incident optical radiation that is reflected by the absorptive structure. Therefore, the openings in the absorptive structure enhance absorption while suppressing reflection at the design wavelength. In addition, the openings reduce the absorptive structure's thermal mass, resulting in a higher dT/dA than in prior microbolometer absorptive structures. A circuit is connected to the absorptive structure for measuring its electrical resistivity.

In the preferred embodiment, the absorptive structure is a polycrystalline semiconductive layer supported by a thermally insulating dielectric "bridge" structure. The semiconductor layer contains a plurality of openings, and the dielectric bridge structure is fabricated on a silicon substrate that contains integrated readout circuitry. The optical radiation director is a reflective metal layer that is also fabricated on the silicon substrate, spaced below the semiconductor layer. The portions of the incident optical radiation that are diffracted by the openings in the semiconductive layer strike the reflective metal layer and are reflected back to the semiconductive layer. The height of the dielectric "bridge" structure (and hence the spacing between the semiconductive layer and the metal layer) is tuned so that, at a predetermined design wavelength, constructive interference occurs within the semiconductive layer between the incident optical radiation in the semiconductive layer and the diffracted radiation that is re-directed back to the semiconductive layer.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 1a is a schematic diagram illustrating the general principles of the invention.

FIG. 1b is a phase diagram illustrating the phase of optical radiation at different locations in the diagram of FIG. 1a.

FIG. 2 is a sectional view of a preferred embodiment of the invention.

DETAILED DESCRIPTION OF THE INVENTION

Figure 3:
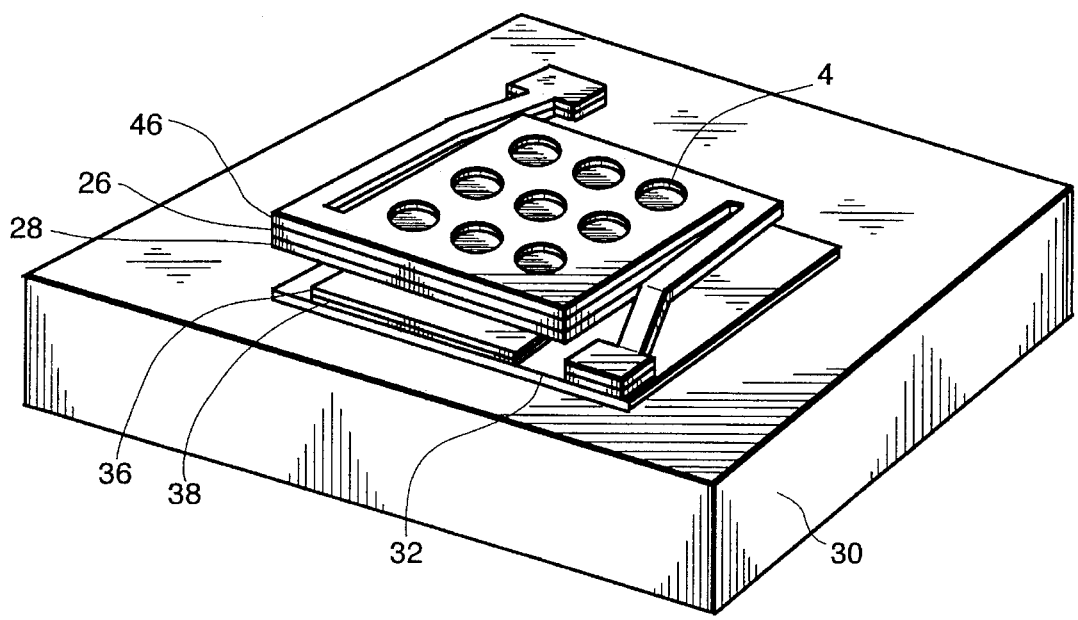
FIG. 3 is a plan view of the detector element of FIG. 2.

FIG. 1 illustrates the basic principles of the invention. An optically absorptive material structure 2 with a plurality of openings 4 is provided. The absorptive structure 2 has an electrical resistance that varies as a function of its temperature. In operation, optical radiation 6 is incident upon the absorptive structure 2. Some of the radiation (represented by arrow 8) is absorbed by the structure 2, some (represented by arrows 10) is reflected from different depths within the structure 2, while some (represented by arrows 12) is diffracted by the openings 4 into directions designated by arrows 12a (which span an angular distribution from approximately 6 degrees to approximately 120 degrees around the propagation direction of arrow 12). The angle of diffractional confinement depends on the ratio of the size of the openings 4, to the incident optical wavelength. Generally, the openings 4 diffract incident optical radiation 6 at wavelengths that are between about one-tenth and twice the diameter of the openings 4, assuming circular openings.

An optical radiation director 14, preferably a mirror, is spaced away from the absorptive structure 2 on the opposite side from the incident radiation 6, and reflects the diffracted optical radiation 16 back towards the absorptive structure 2. The distance between the absorptive structure 2 and the mirror 14 is tuned so that, for a predetermined design wavelength, the diffracted and reflected radiation 18 constructively interferes in the absorptive structure 2 with incident radiation 8 being transmitted through the structure 2. The predetermined design wavelength is the wavelength that the device is primarily designed to detect.

The constructive interference causes the absorptive structure 2 to absorb substantially more optical radiation at the design wavelength than at other wavelengths. The absorption of optical radiation causes a change in the absorptive structure's 2 temperature, which in turn changes its electrical resistivity. The diffracted and reflected optical radiation 18, at the predetermined design wavelength, also destructively interferes with incident radiation 10 that has undergone reflection at the absorptive structure 2, thereby suppressing reflection of incident radiation 6 at the design wavelength. The structure's electrical resistivity is monitored by a conventional readout circuit 20 that is connected to the structure through signal lines 22a and 22b.

For constructive interference to occur between the non-reflected incident radiation 8 and the diffracted and reflected radiation 18, they must be substantially in phase at the absorptive structure 2. This is preferably accomplished by positioning the mirror 14 so that the spacing 3 between the center of the absorptive structure 2 and the upper surface 15 of mirror 14 is equal to one-quarter of the design wavelength. This results in substantially no relative phase difference at the center of the absorptive structure 2 between the non-reflected incident radiation 8 and the diffracted and reflected radiation 18, at the design wavelength. In addition, this spacing produces a 180 degree phase difference between the reflected incident radiation 10 (after reflection) and the diffracted and reflected radiation 18, at the design wavelength, which causes destructive interference between them. This is illustrated by the phase diagram of FIG. 1b, which illustrates the relative optical phase relationships between incident radiation 8 at the middle-plane of the absorptive structure 2 that has not been reflected by the structure 2, incident radiation that has been reflected 10 from the middle-plane of the structure 2, diffracted radiation 16 just prior to reflection from the mirror surface 15, diffracted radiation 18 just after reflection from the mirror surface 15, and the diffracted and reflected radiation 18' when it arrives back at the middle-plane of the structure 2.

At locations off the middle-plane in the absorptive structure 2, the constructive and destructive interference will not be perfect. Since it is not known ahead of time where the majority of reflections and absorptions will take place in the structure 2, spacing the upper mirror surface 15 one-quarter wavelength from the middle-plane of the structure 2 provides a good starting point. The spacing may be subsequently adjusted to "tune" the absorption and reflection characteristics of the detector element.

The openings 4 are preferably sized so that they diffract radiation at wavelengths between about one-tenth and twice the design wavelength. If circular openings are used, this is preferably accomplished by making their diameters approximately equal to about 80 percent of the design wavelength. The openings need not be circular and need not be of uniform size. The shape and size of the openings 4 can be varied, by design, to peak the absorption at several wavelengths, if desired.

FIG. 2 illustrates a preferred embodiment of the invention. A polycrystalline semiconductive layer 26 with an electrical resistance that varies as a function of its temperature is provided. Vanadium oxide ($V_2O_3$) is the preferred material for the semiconductive layer 26, although titanium oxide or any other material that has the required electrical resistance properties may be used. The vanadium oxide layer 26 is supported by a dielectric "bridge" structure 28 that is optically transmissive over the wavelength range of interest, and that has a planar upper portion 29 and sloped leg portions 42. For IR wavelengths, the bridge structure is preferably silicon nitride (which is an optically transmissive dielectric material) fabricated on a silicon substrate 30 that contains integrated readout circuitry 32. The vanadium oxide layer 26 contains a plurality of openings 34 that are preferably circular-shaped with a center-to-center spacing that is designed to be as small as possible without reducing the absorbance of the semiconductor layer 26 (typically approximately twice the diameter of openings 4), and without excessively weakening the semiconductor layer 26 structure. Small center-to-center spacings are preferred because it reduces the total mass of the ababsorptive structure (semiconductive layer 26). The lower mass reduces the heat capacity of the structure, which increases its heat sensitivity. A reflective layer 36, preferably a metal layer, is disposed on the silicon substrate 30, with an insulating layer 38 electrically insulating the readout circuitry 32 from the metal layer 36. The metal layer 36 is preferably either Au, Pt or Al.

The vanadium oxide layer 26 preferably has a main active portion 39 and connectors 40a and 40b that extend down the sloped leg portions 42 of the silicon nitride bridge 28 to metal pads 44a and 44b. The metal pads provide electrical connections between the vanadium oxide connectors 40a and 40b and the readout circuitry 32. The active portion 39 is preferably at least 0.5 microns thick. It is highly desirable that the active portion 39 be kept substantially thermally insulated from the silicon substrate 30 and integrated circuitry 32. To accomplish this, the connectors 40a and 40b are preferably made very thin and narrow relative to the active portion 39. In the preferred embodiment, the vanadium oxide layer 26 is covered by a second optically transmissive dielectric layer 46, preferably a silicon nitride layer, to add strength to the absorptive structure 26 and provide mechanical protection.

In operation, incident optical radiation 6 with a wavelength between approximately one-tenth and twice the size of the openings 4 is diffracted through the openings and emerges as diverging radiation 16. The sizes of the openings 4 are preferably about 80 percent of the desired design wavelength. The diffracted radiation 16 is reflected by the metal layer 36 back to the vanadium oxide layer 26. The silicon nitride bridge 28 is initially designed to produce a spacing between the middle-plane of the vanadium oxide layer 26 and the upper surface of the metal layer 36 equal to one-quarter of the design wavelength. Depending upon the reflection pattern within the vanadium oxide layer, this spacing may or may not absolutely maximize the detector's response to the design wavelength. This can be determined by varying the spacing slightly, such as by thickening and thinning the reflective layer, and monitoring the detector's response to observe when it is greatest. Alternately, the spacing can be left at a quarter-wavelength between the center of the vanadium oxide layer and the upper reflector surface as at least a good approximation of the optimum spacing. The integrated readout circuitry 32 monitors the changes in electrical resistivity to determine the amount of radiation incident on the structure.

FIG. 3 is a plan view of the microbolometer detector element of FIG. 2. The invention is useful in an IR imaging array, with each microbolometer detector element used as a single image pixel. In practice, an array of microbolometers (pixels) is fabricated on a single silicon wafer. As an example, each microbolometer (pixel) may cover an area of approximately 50 microns on a side.

FIG. 4 illustrates successive fabrication steps for the microbolometer detector element of FIG. 2. The microbolometer is preferably fabricated on industry-standard silicon wafers 30 using standard silicon processing techniques (photolithography, etching, etc.). In FIG. 4a, the readout circuitry 32 is fabricated into the silicon wafer 30. The circuitry may include transistors, diodes, bus lines and interconnecting metallizations, and may be of conventional design.

Figure 4A:
FIGS. 4a–4e are sectional views illustrating successive steps in the fabrication of the microbolometer detector element of FIG. 2.
Figure 4B:
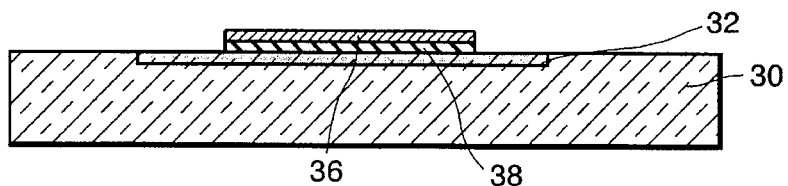
Figure 4C:
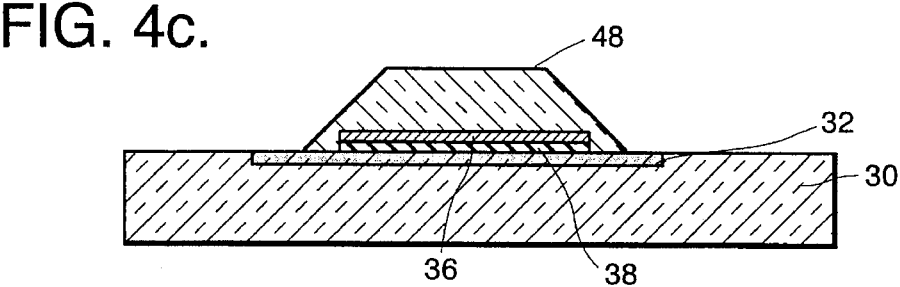

In the next step, the silicon nitride insulating layer 38 and the reflective metal layer 36 are deposited, as illustrated in FIG. 4b. The metal layer 36 is preferably Au, Pt, or Al. In FIG. 4c, a sacrificial layer 48 of soluble material, preferably phos-glass, is deposited. The sides of the sacrificial layer 48 are sloped and will define the sloped sides of the eventual silicon nitride bridge.

Figure 4D:
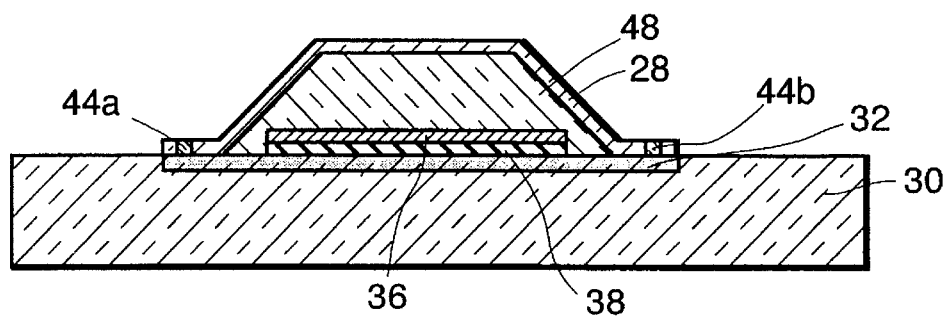
Figure 4E:
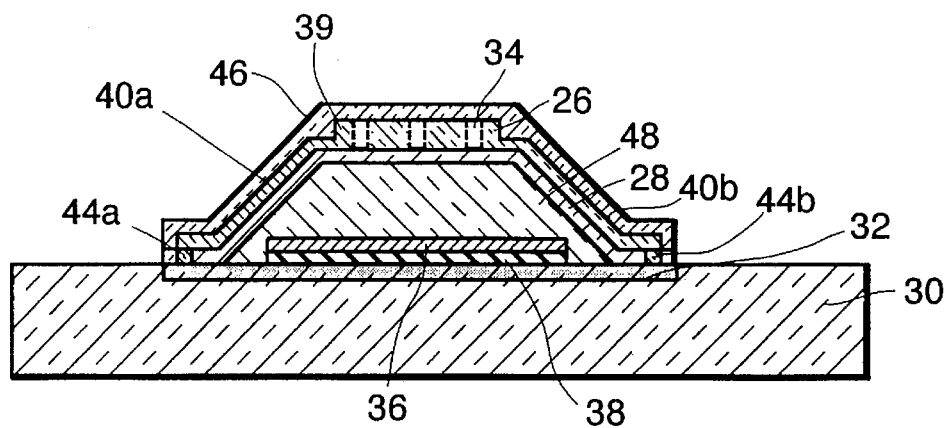

Next, as illustrated in FIG. 4d, the silicon nitride "bridge" layer 28 is deposited over the sacrificial layer 48, and metal pads 44a and 44b are fabricated. The metal pads extend through the silicon nitride layer 28, and contact the underlying readout circuitry 32. In the next step, illustrated in FIG. 4e, the vanadium oxide layer 26 is deposited, preferably using ion beam sputtering, and the openings 34 are etched into the active portion 39 of the layer 26 (during the same etching step that etches out the overall shape of the vanadium oxide layer 26). The vanadium oxide layer 26 is deposited so that connecting portions 40a and 40b are in electrical contact with metal pads 44a and 44b, respectively.

The active portion 39 is preferably at least 0.5 microns thick, however, its thickness may be adjusted to tune the performance of the microbolometer. After the vanadium oxide layer 26 is deposited, the second silicon nitride layer 46 is deposited.

In the final step, the sacrificial layer 48 is removed by immersing the silicon wafer 30 in an etching solution (not shown) that selectively etches the sacrificial layer 48 material, leaving behind the final "bridge" microbolometer structure of FIG. 2. If phos-glass is used as the sacrificial layer 48 material, a diluted, buffered hydroflouric acid solution is the preferred etchant.

Numerous variations and alternate embodiments will occur to those skilled in the art without departing from the spirit and scope of the invention. Although a vanadium-oxide microbolometer is described, the invention may be applied to other material systems, such as polycrystalline or amorphous silicon. Similarly, other semiconductor technologies, such as GaAs technology, may be used for the readout circuitry. Such variations and alternate embodiments are contemplated, and can be made without departing from the spirit and scope of the appended claims.

I claim:

1. A microbolometer detector element, comprising:
   an optically absorptive material structure characterized by an electrical resistivity that varies as a function of its temperature, said structure absorbing a portion of incident optical radiation at a design wavelength, and having a plurality of openings that diffract another portion of said incident optical radiation,
   a radiation director spaced from said absorptive structure and positioned to redirect said diffracted radiation to said structure, the spacing causing said re-directed radiation to constructively interfere with incident radiation at said structure that has not been reflected by said structure, and destructively interfere with incident radiation at said structure that has been reflected by said structure, and
   a sensor connected to sense said absorptive structure's electrical resistivity.

2. The detector element of claim 1, wherein said openings diffract a significant portion of incident radiation with wavelengths between about one-tenth and twice the opening size.

3. The detector element of claim 1, wherein the sizes of said openings are approximately equal to said predetermined design wavelength.

4. The detector element of claim 1, wherein said optically absorptive material structure comprises a polycrystalline semiconductor layer.

5. The detector element of claim 1, wherein said radiation director comprises a mirror.

6. The detector element of claim 5, wherein said mirror is spaced from the center of said absorptive structure by a distance substantially equal to one-quarter of said design wavelength.

7. A microbolometer detector element with increased sensitivity at a design optical wavelength, comprising:
   a semiconductor substrate,
   readout circuitry fabricated on said semiconductor substrate,
   a dielectric layer on said readout circuitry,
   a reflective layer on said dielectric layer,
   an optically transmissive, thermally insulating dielectric bridge structure with leg portions disposed on said semiconductor substrate, and a planar upper portion, and an optically absorptive material layer on said upper bridge portion having an electrical resistivity that varies as a function of its temperature, and positioned with its center spaced from said reflective layer by a distance approximately equal to one-quarter of said design wavelength, said absorptive layer absorbing a portion of incident optical radiation at said design wavelength, and having a plurality of openings that diffract another portion of said incident optical radiation onto said reflective layer, said readout circuitry being connected to said optically absorptive material layer to sense its electrical resistivity.

8. The detector element of claim 7, wherein said openings diffract a significant portion of incident radiation whose wavelengths are between about one-tenth and twice the opening size.

9. The detector element of claim 7, wherein the sizes of said openings are approximately equal to said design wavelength.

10. The detector element of claim 7, wherein said openings are circular-shaped.

11. The detector element of claim 7, wherein said absorptive material layer comprises a polycrystalline semiconductor layer.

12. The detector element of claim 11, wherein said polycrystalline semiconductor layer is selected from the group consisting of vanadium oxide and titanium oxide.

13. The detector element of claim 11, further comprising an optically transmissive dielectric layer on said polycrystalline semiconductor layer.

14. The detector element of claim 7, wherein the center-to-center spacing between said openings is no smaller than the thickness of said absorptive material layer.

15. The detector element of claim 7, wherein said reflective material layer comprises a thin metal coating selected from the group consisting of Au, Pt, and Al.

16. The detector element of claim 7, wherein said substrate is a silicon substrate.

17. The detector element of claim 16, wherein said dielectric layer and said dielectric bridge structure comprises silicon nitride.

18. A method of sensing incident optical radiation, comprising the steps of:

absorbing a portion of said incident radiation with an absorptive structure whose electrical resistivity varies as a function of its temperature, providing openings in said absorptive structure for diffracting another portion of said incident radiation, re-directing said diffracted radiation to said absorptive structure, adjusting the phase of said re-directed diffracted radiation so that, at a predetermined design wavelength, it constructively interferes at said structure with incident radiation that has not been reflected by said structure, and destructively interferes with incident radiation that has been reflected by said structure, and sensing the temperature change induced in said structure by the radiation absorption.

19. The method of claim 18, wherein the phase of said re-directed diffracted radiation is adjusted to increase absorption and reduce reflection of incident optical radiation, at said predetermined design wavelength, at said absorptive structure.

20. The method of claim 18, wherein the size of said openings are made substantially equal to said design wavelength, and said diffracted radiation is re-directed to said structure by reflecting it with a reflector.

21. The method of claim 20, wherein the phase of said re-directed radiation is adjusted by adjusting the distance between said reflector and said absorptive structure.

* * * * *